United States Patent [19]

Cipelletti

[11] Patent Number: 4,563,880
[45] Date of Patent: Jan. 14, 1986

[54] ICE-CREAM MACHINE FOR FAMILY USE

[75] Inventor: Alberto Cipelletti, Guardamiglio, Italy

[73] Assignee: Firm Alberto Cipelletti, Guardamiglio, Italy

[21] Appl. No.: 637,110

[22] Filed: Aug. 2, 1984

[30] Foreign Application Priority Data

Aug. 4, 1983 [IT]  Italy ............................... 22591/83[U]

[51] Int. Cl.$^4$ .............................................. A23G 9/00
[52] U.S. Cl. ....................................... 62/234; 62/155; 62/342
[58] Field of Search ................. 62/151, 155, 342, 343, 62/234

[56]  References Cited
U.S. PATENT DOCUMENTS 2,709,343  5/1955  Muffly .................................... 62/234
3,452,555  7/1969  Thurman et al. ................. 62/342 X
4,392,361  7/1983  Cavalli ............................ 366/309 X
4,476,146 10/1984  Manfroni ......................... 62/342 X Primary Examiner—William E. Tapolcai
Attorney, Agent, or Firm—Millen & White

[57]  ABSTRACT

The invention relates to an ice-cream machine for family use with removable whisking vessel, of the type comprising its own refrigerating unit formed by a compressor, a condenser, a lamination valve or a capillary and an evaporator in conditions of thermal exchange with the vessel container. In order to allow for the removal of the vessel when the ice-cream is ready, the refrigerating circuit, between said compressor and condenser, has a duct controlled by a solenoid valve, which opens between said lamination valve or capillary and said evaporator, in order to send at the end of the ice-cream formation, the hot gas outflowing from said compressor directly into said evaporator.

1 Claim, 1 Drawing Figure

U.S. Patent  Jan. 14, 1986  4,563,880
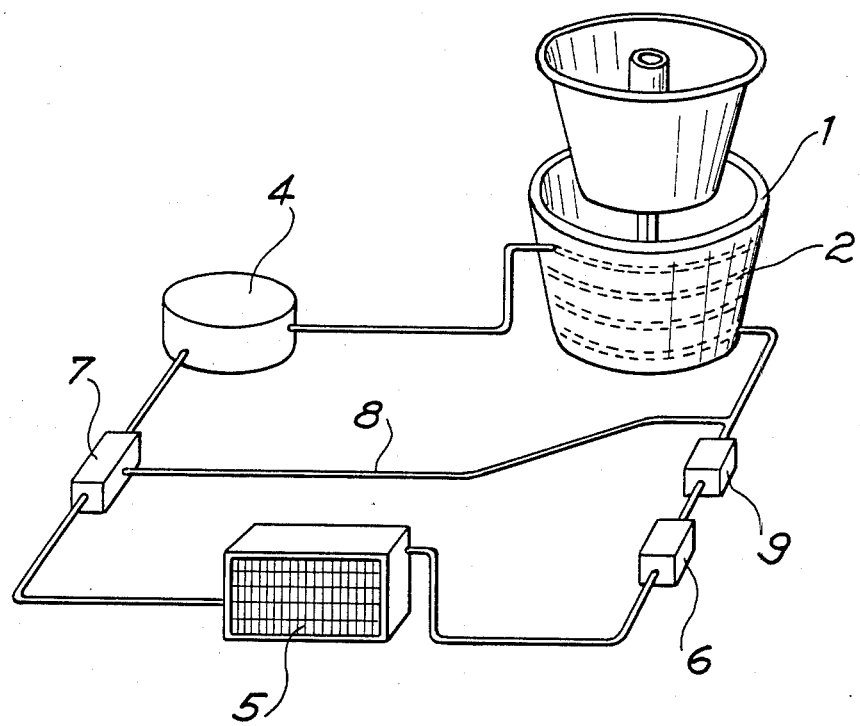

ICE-CREAM MACHINE FOR FAMILY USE

BACKGROUND OF THE INVENTION

1. Field of the Invention

This invention relates to an ice-cream machine for family use with a whisking vessel which is removable from the ice-cream machine body, and in particular it relates to an ice-cream machine of the aforementioned type wherein new and higher usefulness is obtained in comparison with the ice-cream machines for family use known up to now, allowing in particular an easy removal of the whisking vessel from the ice-cream machine body.

2. Description of the Prior Art

The possibility of removing the whisking vessel from the ice-cream machine body involves the technical problem of obtaining, at reasonable costs, the coupling between the side walls of the vessel and the walls of its container, avoiding the formation of hollow spaces where, during the steps of ice-cream preparation, ice layers tend to form.

Said ice layers are actually highly undesirable in that, besides hampering cold transmission between the evaporator of the refrigerating circuit of the ice-cream machine and the vessel contents, at the end of the steps of ice-cream preparation they make the removal of the vessel from the ice-cream machine body very difficult.

From a previous patent application of the same applicant an ice-cream machine for family use is made known wherein, in order to obtain the most precise possible coupling between the vessel and its container to limit to the utmost ice formation, the vessel and its container present a truncated-cone configuration.

From a further previous application of the same applicant it is also made known an ice-cream machine for family use wherein, for the same objects as those of the aforementioned patent application, the side walls of the vessel container are formed by at least two different parts which are kept in close contact with the side walls of the vessel by elastic means which can be loosened.

Though in the ice-cream machines of said previous patent applications the formation of ice layers between the side walls of the vessel and those of its container is extremely reduced, it cannot be avoided that, during the steps of ice preparation, at least a film of ice forms between the side walls of the vessel and those of its container. Said ice film, which only very slightly hampers cold transmission between the evaporator and the vessel container, however makes the removal of the vessel from the ice-cream machine body very difficult and hard.

In fact the ice film between the vessel and its container, forms a very resistant element of cohesion which is hardly interrupted when the vessel must be removed from its container.

An object of the present invention is therefore to propose an ice-cream machine, for example of the type described and claimed in the aforementioned patent applications which allows, at the end of the steps of ice-cream formation, to quickly dissolve the film of ice between the vessel and its container in order to allow an easy removal of the vessel from the ice-cream machine body.

SUMMARY OF THE INVENTION

Said object is achieved by means of an ice-cream machine for family use with a removable whisking of the type comprising its own refrigerating unit formed by a compressor, a condenser, a lamination valve or a capillary and an evaporator, in conditions of thermal exchange with the vessel container, wherein the refrigerating circuit, between said compressor and condenser, has a duct, controlled by a solenoid valve, which duct opens between said lamination valve and said evaporator, in order to send at the end of the ice-cream formation, the hot gas outflowing from the compressor directly into the evaporator.

BRIEF DESCRIPTION OF THE DRAWING

The only FIGURE is a scheme of the refrigerating circuit in an ice-cream machine for family use.

DESCRIPTION OF THE PREFERRED EMBODIMENT

With reference to the FIGURE, ice-cream machine comprises a container 1 for its vessel, for instance such as the one described and claimed in the aforementioned patent applications, in conditions of thermal exchange with the evaporator 2 of a refrigerating circuit housed in the ice-cream machine.

The evaporator 2 consists of a coil buried in the side walls of container 1 or wound up around the external side walls of the container itself.

The refrigerating circuit of the ice-cream machine comprises, besides the evaporator 2, a compressor 4, a condenser 5 and a lamination valve or capillary 6 expansion nozzle. Between the compressor 4 and the condenser 5 a slide solenoid valve 7 is provided, in order to connect, by means of a duct 8, the compressor 4 directly with evaporator 2. Immediately upstream of the point to which the duct 8 opens, in the section of the circuit between the lamination valve 6 and the evaporator 2, a check valve 9 is provided, capable of preventing the refrigerating fluid, outflowing from the duct 8, from flowing towards the condenser.

The solenoid valve 7 is actuated by a conventional push button 10 placed on the control panel of the ice-cream machine and the position of the solenoid valve allowing a compressor-evaporator direct connection can be regulated by a conventional timer 11 connected to the solenoid in a conventional manner.

During the ice-cream formation, the solenoid valve is positioned a first mode in a way as to cut out the duct 8 from the refrigerating circuit; therefore the gas ouflowing from the compressor flows into the condenser, expands going through the lamination valve and then evaporates in the evaporator coil, yielding its units of refrigeration to the vessel container.

At the end of the stage of ice-cream formation, it is possible, by pressing the push button 10 controlling the solenoid valve 7 to modify the position of the solenoid valve itself to put the solenoid valve in a second mode in a way as to convey the hot gas outflowing from the compressor directly into the coil of evaporator 2, through the duct 8. In this way the temperature of the vessel container rapidly increases dissolving the film of the ice existing on the internal side walls of the container itself and the vessel can be removed with no trouble at all.

In particular, in order to render more easy the removal of the vessel from its container, it is sufficient to dissolve the film of ice immediately in contact with the walls of the container by feeding the evaporator coil with compressed hot gas for a few seconds, the time necessary to raise the temperature of the side walls of the vessel container by some degrees over 0° is controlled by the timer 11.

An important advantage of the ice-cream machine according to this invention is to allow an easy and almost immediate removal of the vessel from its container using the refrigerating unit of the ice-cream machine, simply by applying said solenoid valve and relevant duct, a very simple and economic application in itself.

I claim:

1. An ice-cream making machine for family use; wherein the ice-cream machine includes an integral refrigerating unit having an evaporator, an expansion nozzle, a condenser and a compresser connected to one another in series by a refrigerant line; the evaporator including a container with coils therein which container retains a removable whisking vessel having the ice-cream therein which whisking vessel is cooled by the evaporator, the improvement characterized by:

an auxiliary duct connected to the refrigerant line upstream of the expansion nozzle and downstream of the evaporator for receiving hot refrigerant from the evaporator, a solenoid valve disposed in the refrigerant line between the condenser and compressor; the solenoid valve having a first mode of operation wherein condensed, cool refrigerant flows from the compressor to the condenser, and a second mode of operation wherein uncondensed, hot refrigerant flows from the compressor to the evaporator to feed hot refrigerant to the evaporator, wherein ice which has formed between the container of the evaporator and the whisking vessel is melted freeing the whisking vessel for easy removal from the container;

pushbutton means for operating the solenoid to switch the solenoid from the first mode to the second mode;

timing means for limiting duration of the solenoid valve operation in the second mode to a time just sufficient to melt the ice disposed between the container and whisking vessel, and a check valve positioned between the evaporator and capillary for preventing refrigerant from flowing towards the condenser.

* * * * *